Patented Feb. 13, 1923.

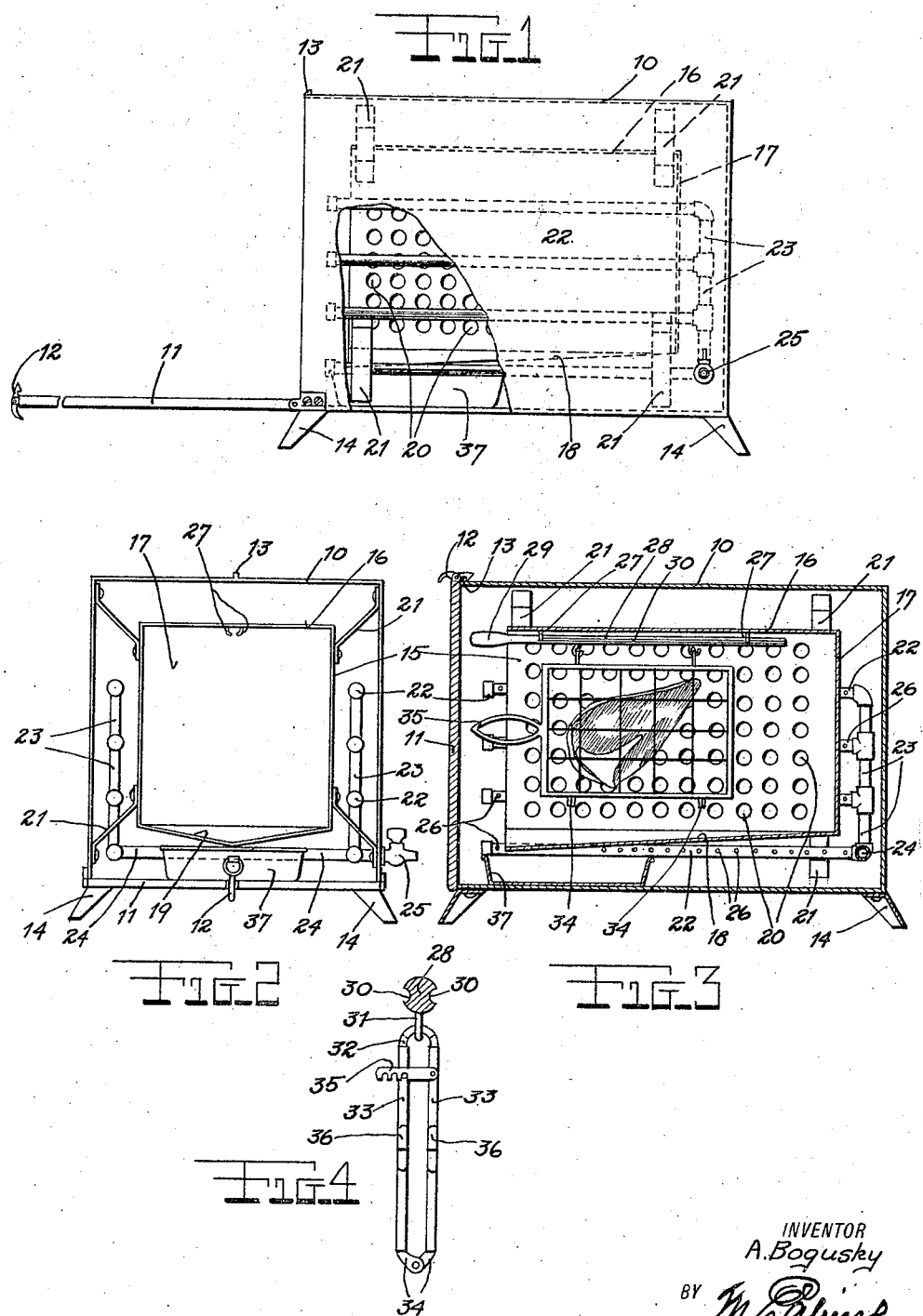

1,444,945

UNITED STATES PATENT OFFICE.

ANTONI BOGUSKY, OF NEW YORK, N. Y.

MEAT OVEN.

Application filed January 26, 1922. Serial No. 531,875.

*To all whom it may concern:*

Be it known that I, ANTONI BOGUSKY, a citizen of Poland, residing at New York, in the county of New York and State of New York, have invented certain new and useful Improvements in Meat Ovens, of which the following is a specification.

One of the objects of this invention is to provide a portable gas heated oven particularly designed for roasting and broiling meats.

Another object is the provision of means for suspending hinged meat retaining grids adjacent heat diffusing walls of the cooking compartment.

A third object relates to the means whereby the juices of the cooking meat are collected and drained in a receptacle removable from the oven.

These and other objects are attained by the novel construction and arrangement of parts hereinafter described and shown in the accompanying drawing, forming a material part of this disclosure, and in which:—

Figure 1 is a side elevational view of the oven with the front open and a side broken away showing the interior of the oven compartment.

Figure 2 is a front elevational view of the same.

Figure 3 is a longitudinal sectional view showing the grid in cooking position.

Figure 4 is an end view of the hinged grid element.

Referring to the drawing in detail, the numeral 10 represents in general a metal casing, open at the front and provided with a drop fall door 11 for closing the casing; a latch 12, pivoted on the door, engages a lug 13 secured to the top of the casing.

Supporting feet 14 are provided at the four corners of the casing bottom or base. Interiorly of the casing is a rectangular metal oven 15 having an imperforate top and end 16 and 17 respectively, and an angularly inclined imperforate bottom 18, bent centrally and longitudinally of its length forming an angular trough 19 its lowest point being at the front.

The side walls are provided with perforations 20 arranged in parallel rows for admitting and distributing heat evenly about the oven.

Supports 21 are provided for holding the oven rigidly and centrally with respect to the outer casing.

Centrally of the spaces, between the oven sides and the casing sides, are a plurality of gas pipes 22, connected in the form of branches to the vertically disposed pipe elements 23 at the rear of the casing, and which in turn are connected to the horizontal cross pipe 24, one side of which projects through the casing side and engages a gas regulating valve 25.

Perforations 26 are provided in the branch pipe 22 in a manner adapted to throw a flame against the perforated sides of the oven 15.

Secured to the top of the oven and extending downwardly are pairs of inturned hook elements 27, adapted to engage a rod 28 having a handle 29 and provided with a pair of oppositely disposed parallel grooves 30, adapted to engage and be held by the hooks 27.

Open hooks 31 are fixed in the lower portion of the rod 28 and engage the open ended, overlapping hooks 32 fixed to the top edges of a grill 33, the same being provided with hinges 34 for opening.

A latch 35 provides adjustable means for securing the grid elements together and handles 36, integral with the grid sides, permit the grid to be easily manipulated.

A receptacle 37, enterable between the oven bottom and the casing, is adapted to hold the juices collected and delivered by the trough 19.

From the foregoing it will be seen that a simple device for this purpose has been disclosed in the preferred form of its embodiment, but it is not desired to restrict the details to the exact construction shown, it being obvious that changes, not involving the exercise of invention, may be made without conflicting with the claims hereto appended.

Having thus described my invention, what I claim as new and desire to secure by Letters Patent, is:—

1. A gas stove comprising a rectangular casing having a door, legs for said casing, a cooking chamber spaced centrally of the casing, the walls of said chamber being perforate, perforated gas pipes arranged in the space between said casing and the walls of said chamber, a valve for controlling the fuel supply, a vertical grid composed of hinged elements, means for adjustably clamping the elements of said grid, means engageable with the chamber for slidably supporting said grid, and means for collecting the juices extracted from meats cooked in said grid.

2. A gas stove comprising a casing including a cooking chamber having imperforate top, bottom and rear end elements, side walls connecting said imperforate elements, said side walls having parallel rows of perforations formed therethrough, permitting heat to be evenly distributed interiorly of the chamber, guides fixed within the chamber, a bar, grooves formed on said bar adapted to slidably engage said guides, hooks secured to the bar, a grid supported by said hooks, a trough below said grid formed integral with the bottom of the chamber and adapted to collect and deliver the juices extracted from heated meats held within the grids, and means for maintaining said cooking chamber rigidly and centrally within the outer casing.

In witness whereof I affix my signature.

ANTONI BOGUSKY.